Patented Nov. 25, 1952

2,619,427

UNITED STATES PATENT OFFICE 2,619,427

SOLUTIONS OF CELLULOSE NITRATE IN N-DIALKYL PHOSPHORIC ACID AMIDE

Morris Levine, Fort Worth, Tex., assignor, by mesne assignments, to Southern Production Company, Inc., Fort Worth, Tex., a corporation of Delaware No Drawing. Application February 2, 1949, Serial No. 74,230

7 Claims. (Cl. 106—177)

This invention relates to improved resin solutions and more particularly to the production of nitrocellulose solutions characterized by exceptionally high tolerances for extenders such as toluene, zylene and other aromatic hydrocarbons.

As is known cellulose nitrate is widely employed in the coating industry as, for example, for coating or finishing wood, plastics, metals and fabrics. High quality cellulose nitrate lacquers, as formulated at the present time, present many advantages. The lacquer dries readily at room temperature to produce surface films which are extremely tough and long lasting, which are but slightly attacked by dilute acids and alkalis and offer good resistance to ordinary water and gasoline. These lacquers generally consist of mixtures of low viscosity cellulose nitrate with one or more natural or synthetic resins and small quantities of a plasticizer, such as phthalic esters, dissovled in a suitable solvent. The solvent may comprise an ester such as butyl or amyl acetate and/or a ketone such as methyl ethyl ketone and an alcohol such as ethyl or isopropyl together with an extender such as toluene or zylene. The solvent employed for such lacquers is a most important factor in such lacquer formulations. Such solvent must not be too volatile because the cooling effect of its rapid evaporation may produce blushing of the films. Similarly, if such solvent evaporates before all of the nonsolvent or extender leaves the lacquer film, blushing may result.

The extender employed in these lacquers subserves important functions. Such extenders serve to reduce the viscosity of the solution thus insuring a solution which contains a desirably high solids content and yet has a desirable viscosity enabling ready application as, for example, by spraying or brushing. Additionally, inasmuch as the typical extenders are less expansive than the ester and ketone solvents, their use commensurately reduces the cost of the finished lacquer.

The extender in a lacquer formulation acts essentially as a diluent compatible with the solvent. However, as those skilled in the art well appreciate, the quantity of an extender that may be added to a nitrocellulose solution is definitely limited and the addition of quanities beyond such limit causes precipitation of the nitrocellulose. This limit is designated in the art as the dilution ratio and is the maximum volume of the particular extender that can be added to the cellulose nitrate solution without causing precipitation, divided by the volume of the solvent. The dilution ratio, of course, varies depending upon the particular extender and solvent employed, and to a lesser extent with the concentration of the cellulose nitrate. The addition of a resin to the formulation also may somewhat affect the dilution ratio. As an example, which may be considered as a standard, the dilution ratio of solutions of cellulose nitrate in butyl acetate with respect to toluene may be 2.5 to 2.9 depending upon the concentration.

There are, naturally, many circumstances or conditions in which it is highly desirable to utilize a solvent for cellulose nitrate that has a higher dilution ratio than that obtaining for butyl acetate, and particularly, as in the case of the novel solvent about to be described, if such a solvent is also a solvent for the modifying resins, such as the vinyl and maleic resins, generally employed in lacquer formulations.

As a result of extensive investigations, a new type of solvent for cellulose esters, particularly cellulose nitrate, has been found which is characterized not only by an excellent solvent power for cellulose nitrate but also by an extraordinarily high tolerance for the typical extenders such as toluene. This novel group of solvents comprise the N-dialkyl acid amides particularly N-dialkyl phosphoric acid amides and more particularly N-dimethyl phosphoric acid amide. The phosphoric acid derivatives may be prepared in any suitable manner as, for example, according to the synthesis described in the copending application of Robert M. Isham, Ser. No. 37,964, filed July 9, 1948.

The synthesis described in such cross referenced application involves the reaction of phosphorus oxychloride, or equivalent reactant, with the corresponding dialkyl amine to produce dialkyl phosphoric acid amide and the dialkyl amine hydrochloride in accordance with the following simplified equation:

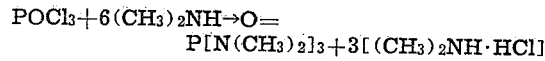

The two end products may be then separated and the amine regenerated from the hydrochloride and reused in the process.

In the preferred method N-dimethyl phosphoric acid amide, for example, may be prepared by reacting dimethyl amine, substantially completely free from monomethyl amine, with phosphorus oxychloride in the molar ratio of amine to oxychloride of between 1:6.2 to 1:8, in the presence of a nonreactive diluent, such as dibutyl ether, which dissolves the amine, oxychloride and dimethyl phosphoric acid amide and which wets but does not dissolve moist dimethyl amine hydrochloride, heating the reaction mixture to a temperature of between 60° F. and 200° F. for a time sufficient to complete the reaction, separating the formed solid dimethyl amine hydrochloride from the diluent solution, distilling off the diluent and recovering as the residue the N-dimethyl phosphoric acid amide.

The physical characteristics of this type of solvent render it particularly suitable for the described use. The preferred member of the group, namely N-dimethyl phosphoric acid amide is a free flowing, substantially colorless liquid having a boiling point of 235° C.; its specific gravity is 1.03 at 60° F. and its viscosity is 3.5 centistokes at 60° F. Of particular significance in lacquer formulation is the low vapor pressure of this compound which is about 0.02 mm. at atmospheric temperature. This, it will be observed, is much lower than the vapor pressure of toluene or other similar aromatic hydrocarbons usually employed as extenders, and hence when such extenders are employed in lacquer formulation with the novel solvents described herein, precipitation of the cellulose nitrate before the film has dried cannot take place.

Another peculiarly valuable characteristic of the N-dialkyl phosphoric acid amides is that they function as effective plasticizers, thus permitting either the reduction of the quantity of the plasticizers, usually employed or, in certain cases, eliminating such extraneous plasticizers completely.

The marked utility of the new group of solvents in lacquer formulations will be more readily appreciated and evaluated by a direct comparison between the tolerances for toluene of these new solvents and a typical, currently employed solvent, namely butyl acetate. In these tests, recorded below in Table I, the usual procedure was followed which comprised the titration of 5 grams of the indicated cellulose nitrate solution with toluene until a persistent cloud or precipitation was obtained. The results are recorded in terms of dilution ratio.

Table I

| Solute | Solvent | Concentration of Solution | Dilution Ratio |
| --- | --- | --- | --- |
| ½ Sec. Nitrocellulose. | Butyl Acetate | 28% by wt | 2.56 |
| Do | N-dimethyl Acetamide | 28% | 7.29 |
| Do | N-dimethyl Phosphoric Acid Amide | 28% | 25.0 |
| Do | N-diethyl Phosphoric Acid Amide | 28% | 15.55 |

The extraordinary high dilution ratios of the novel solvents of the present invention, as established by the results of the above recorded tests, are as striking as they are unpredictable. As will be observed, the dilution ratio of N-dimethyl phosphoric acid amide is ten fold greater than that of butyl acetate. This high tolerance for extenders such as toluene similarly characterizes the other members of the group although to a lesser degree.

The solvents of the invention also possess another important and advantageous property in respect to lacquer formulations. As is known, blushing of the cellulose ester film occurs when the solvent evaporates at an excessive rate in comparison with the evaporation rate of the extender so that at some particular moment the quantity of unvaporized non-solvent with respect to the quantity of solvent which remains in the solution exceeds the dilution ratio. It is also a known fact that the accidental addition of water may also cause blush. It has been ascertained that the solutions of cellulose nitrate in the solvents of the present invention are slightly and desirably hydrophyllic and will tolerate some minor amounts of water which, however, would cause the usual solutions to blush. Thus, for example, whereas a 28% solution of cellulose nitrate in butyl acetate will tolerate only 0.014 cc. of water per cc. of solvent, without precipitation or cloud formation, a solution of the same concentration of the plastic in N-dimethyl phosphoric acid amide will tolerate as much as 0.8 cc. of water per cc. of solvent; in other words, about sixty times as much as a butyl acetate solution.

The solvents comprehended in the present invention have other properties which are of salient technological significance, namely a substantial solvent power for natural and synthetic resins. As is known, many of the cellulose nitrate formulations include the addition of natural and synthetic resins to advantageously modify the characteristics of the ultimate film as, for example, to improve the gloss and adhesion of the film. While natural resins or gums such as damar and elemi have been thus employed, the high quality lacquers currently produced utilize synthetic resins such as maleic and vinyl resins. For example, non-drying alkyd resins are used to a considerable extent as plasticizers for cellulose nitrate lacquers. Now, while butyl acetate is an effective solvent for cellulose nitrate, it is not a suitable solvent for a mixture of the cellulose nitrate and synthetic resin. Hence, in the past when synthetic resins were employed in the formulation, it was found necessary to add other solvents, such as ketones, in order to secure a clear solution of the two solutes.

This drawback of limited or restricted solubility does not obtain with the solvents of the invention; on the contrary, the solvents contemplated herein possess, so to speak, dual solubility. It has been ascertained that a solution of cellulose nitrate in N-dimethyl phosphoric acid amide is entirely compatible with a solution of a natural or synthetic resin in this same solvent.

It has been determined that solutions of cellulose nitrate and synthetic resins in N-dimethyl phosphoric acid amide as the sole solvent has, unexpectedly, a remarkably high dilution ratio. Thus, it has been established that a mixture of a 20% solution of cellulose nitrate in N-dimethyl phosphoric acid amide with an equal quantity of a 20% solution of "vinylite" in this same solvent has a dilution ratio of 42.3 which, as will be noted, is notably higher than the dilution ratio of the cellulose nitrate solution alone. The term "vinylite" as used herein comprehends polyvinyl acetate, polyvinyl chloride and the co-polymers polyvinyl chloride-acetate.

As a result of further experimentation and test it was found that as striking was the high dilution ratio of solutions of cellulose nitrate and "vinylite" in the described solvent, the dilution ratio of solutions of the nitrate and maleic resin was even higher. For example, a mixture comprising a 15% cellulose nitrate solution in N-dimethyl phosphoric acid amide and an equal volume of a 20% solution of a maleic resin in this same solvent was titrated with toluene in the matter previously described. It was determined that for practical purposes there was, in fact, no upper limits of dilution ratio, for no precipitation or clouding occurred even when the volume of toluene added was seventy times the volume of the solvent present. In this particular test the cellulose nitrate employed still contained some alcohol added by the supplier but this quantity of alcohol was taken into consideration in the calculations. It is thus apparent that for a mixture of cellulose nitrate and a maleic resin in N-dimethyl phosphoric acid amide, containing a small amount of alchol, the toluene constitutes a simple diluent and, in any measurable degree, does not reduce the solubility power of the solvent, as it does in all of the similar systems known heretofore. This unpredictable finding, as will be appreciated, is of profound technological significance.

While, as noted, N-dimethyl phosphoric acid amide is the preferred solvent, the common solvent power for synthetic resins and cellulose esters characterizes the other members of the novel group of solvents, albeit, to a lesser degree or extent. Thus, a mixture of 20% cellulose nitrate in dimethyl acetamide and 20% maleic resin in the same solvent has a dilution ratio of 9.47. While this is considerably less than that of equivalent solutions of which N-dimethyl phosphoric acid amide constitutes the essential solvent, nevertheless it is considerably higher than the dilution ratio of solvent mixtures utilized heretofore.

Although, as noted above, the solvents contemplated herein are highly effective when utilized as the main or essential solvent component in resin formulations, the utility of such solvents is not thus limited. Thus, they may be used as solvent adjuvants in a widely ramified range of solvent-resin solutions to confer improved and special properties on such solutions and the films resulting therefrom. As an example of such a use, it has been found that these new solvents constitute beneficial additions to the earlier type solvents, e. g., butyl acetate, to increase the dilution ratio of such less effective solvent. The advantageous results accruing from such additions has been established as a result of tests on the effect, on dilution ratio, of the addition of varying amounts of N-dimethyl phosphoric acid amide to a typical lacquer solvent, namely, butyl acetate.

Table II

| Solvent | | Dilution Ratio |
|---|---|---|
| Vol. Percent N-dimethyl Phosphoric Acid Amide | Vol. Percent Butyl Acetate | |
| 0 | 100 | 2.56 |
| 21.74 | 78.26 | 6.36 |
| 31.88 | 68.12 | 11.31 |
| 42.45 | 57.55 | 13.15 |
| 100 | 0 | 25 |

It is thus apparent from the data recorded in the above table that additions of N-dimethyl phosphoric acid amide to lacquer solvents such as butyl acetate greatly increase the tolerance of the latter for aromatic extenders.

While, as explained hereinbefore, the novel group of solvents are peculiarly effective in the formulation of the cellulose ester lacquers for coating compositions, it will be apparent that this is given mainly as an example of but one technological use of the new solvents. Obviously the novel solvents described may be employed in the process of manufacturing the cellulose nitrate moulding compositions, i. e., they may be employed in the colloiding step in such processes. Likewise, since the new group of solvents, as shown, possess good solvent powers for natural and synthetic resins such as the alkyd and vinyl resins, it is apparent that they may be employed either alone or in admixture with other compatible solvents or plasticizers in the production of solutions of such resins and plastics. Hence, while preferred modifications of the invention have been described, it is to be understood that these are given didactically to establish the value and efficacy of the described materials as improved solvents for natural and synthetic resins.

I claim:

1. A composition comprising a solution of cellulose nitrate in N-dimethyl phosphoric acid amide.

2. A composition comprising a solution of a cellulose nitrate in an N-dialkyl phosphoric acid amide.

3. A composition comprising a solution of a cellulose nitrate in N-diethyl phosphoric acid amide.

4. A lacquer characterized by a high tolerance for aromatic extenders comprising a solution of cellulose nitrate in a solvent therefor, such solvent being comprised at least in part of an N-dialkyl phosphoric acid amide such solution also containing an aromatic extender.

5. As a lacquer solvent a solution comprising an alkyl ester having marked solubility for cellulose nitrate and N-dimethyl phosphoric acid amide.

6. As a lacquer solvent a solution comprising an alkyl ester having a marked solubility for cellulose nitrate and N-diethyl phosphoric acid amide.

7. As a lacquer solvent a solution comprising an alkyl ester having a marked solubility for cellulose nitrate and N-dialkyl phosphoric acid amide.

MORRIS LEVINE.

REFERENCES CITED

The following references are of record in the file of this patent:

UNITED STATES PATENTS

| Number | Name | Date |
|---|---|---|
| 2,172,241 | Dickey et al. | Sept. 5, 1939 |
| 2,487,859 | Dickey et al. | Nov. 15, 1949 |